(12) United States Patent
Wegener

(10) Patent No.: US 7,708,335 B2
(45) Date of Patent: May 4, 2010

(54) AIR-GUIDING DEVICE OF A VEHICLE

(76) Inventor: Fritz Wegener, Orionstrasse 40, Gilching (DE) D-82205

( * ) Notice: Subject to any disclaimer, the term of this patent is extended or adjusted under 35 U.S.C. 154(b) by 0 days.

(21) Appl. No.: 11/913,212

(22) PCT Filed: May 10, 2006

(86) PCT No.: PCT/DE2006/000799

§ 371 (c)(1),
(2), (4) Date: Oct. 31, 2007

(87) PCT Pub. No.: WO2006/119746

PCT Pub. Date: Nov. 16, 2006

(65) Prior Publication Data

US 2008/0211261 A1    Sep. 4, 2008

(30) Foreign Application Priority Data

May 11, 2005  (DE) ................. 10 2005 021 832

(51) Int. Cl.
*B60J 9/00* (2006.01)
(52) U.S. Cl. ................ 296/180.5; 296/180.1
(58) Field of Classification Search .......... 296/185.5, 296/180.5, 180.1, 180.2
See application file for complete search history.

(56) References Cited

U.S. PATENT DOCUMENTS

| | | | | |
|---|---|---|---|---|
| 2,823,072 A | * | 2/1958 | Podolan ................... | 296/91 |
| 4,174,863 A | * | 11/1979 | Gotz ...................... | 296/180.5 |
| 4,444,368 A | * | 4/1984 | Andrews ................. | 244/216 |
| 4,756,568 A | * | 7/1988 | Yamamoto et al. ........ | 296/180.1 |
| 4,810,022 A | * | 3/1989 | Takagi et al. ............. | 296/180.5 |
| 4,854,635 A | * | 8/1989 | Durm et al. .............. | 296/180.5 |
| 4,887,681 A | * | 12/1989 | Durm et al. .............. | 296/180.5 |
| 4,889,382 A | * | 12/1989 | Burst et al. .............. | 296/180.5 |
| 5,074,612 A | * | 12/1991 | Liese et al. .............. | 296/180.5 |
| 5,120,105 A | * | 6/1992 | Brin et al. ............... | 296/180.5 |

(Continued)

FOREIGN PATENT DOCUMENTS

DE        4207658        9/1993

(Continued)

*Primary Examiner*—Kiran B. Patel
(74) *Attorney, Agent, or Firm*—Fitch, Even, Tabin & Flannery; John M. Naber

(57) ABSTRACT

The invention relates to an air-guiding device (10) of a vehicle (1), comprising a spoiler (12) fastened to a spoiler base (14), and an adjusting device (20) for adjusting the spoiler base (14) between an inoperative position, in which the spoiler (12) is essentially situated within the vehicle contour (3), and at least one first operating position, in which the spoiler (12) is deployed beyond the vehicle contour (3) in order to provide a down force effect during the journey, the adjusting device (20) comprising a pivoting-link arrangement (22, 28) coupled to the spoiler base (14) and controllable driving means for pivoting the pivoting-link arrangement (22, 28) in order to adjust the spoiler base (14) between the inoperative position and the operating position. In order to permit a greater maximum deployment angle of the spoiler, according to the invention the adjusting device (20) is suitably designed in order to overstretch a joint (26) between a front region of the spoiler base (14) and an end of a front pivoting link (22) of the pivoting links (22, 28) during deployment of the spoiler (12).

9 Claims, 4 Drawing Sheets

U.S. PATENT DOCUMENTS

Figure 1:
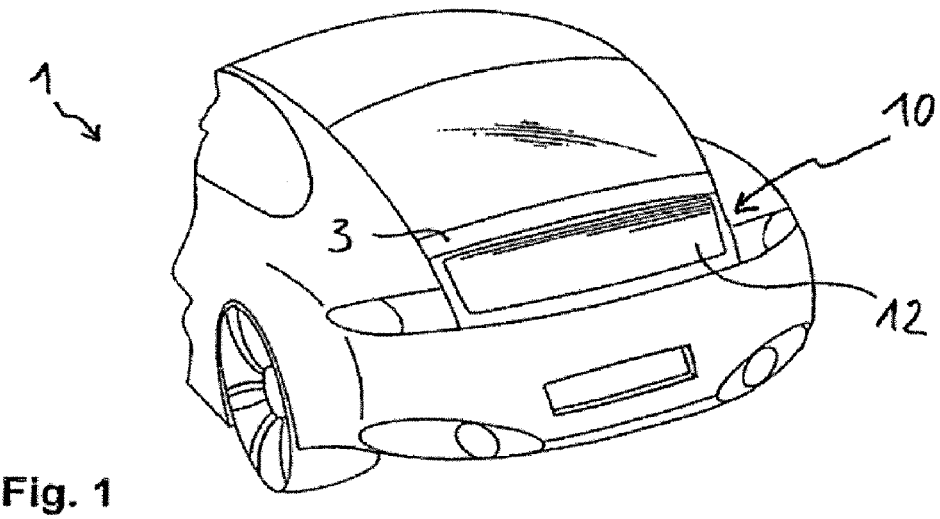

| | | | |
|---|---|---|---|
| 5,141,281 A * | 8/1992 | Eger et al. | 296/180.5 |
| 5,165,751 A * | 11/1992 | Matsumoto et al. | 296/180.5 |
| 5,923,245 A * | 7/1999 | Klatt et al. | 296/180.1 |
| 6,170,904 B1 * | 1/2001 | Schaedlich et al. | 296/180.1 |
| 7,201,432 B2 * | 4/2007 | Roth | 296/180.5 |
| 7,380,870 B2 * | 6/2008 | Froeschle et al. | 296/180.5 |
| 7,380,871 B2 * | 6/2008 | Froeschle et al. | 296/180.5 |
| 7,387,330 B2 * | 6/2008 | Froeschle et al. | 296/180.5 |
| 7,399,026 B2 * | 7/2008 | Froeschle et al. | 296/180.5 |
| 2007/0145776 A1 * | 6/2007 | Grave et al. | 296/180.5 |
| 2007/0228771 A1 * | 10/2007 | Froeschle et al. | 296/180.1 |
| 2007/0228772 A1 * | 10/2007 | Froeschle et al. | 296/180.1 |
| 2007/0228773 A1 * | 10/2007 | Froeschle et al. | 296/180.5 |
| 2007/0236044 A1 * | 10/2007 | Froeschle et al. | 296/180.5 |
| 2008/0179915 A1 * | 7/2008 | Wegener et al. | 296/180.1 |
| 2008/0265089 A1 * | 10/2008 | Zeumer | 244/99.3 |

FOREIGN PATENT DOCUMENTS

| | | |
|---|---|---|
| DE | 10222082 | 11/2003 |
| DE | 10309369 | 9/2004 |
| JP | 60092993 | 5/1985 |

* cited by examiner

AIR-GUIDING DEVICE OF A VEHICLE

This application is a 35 U.S.C. §371 National Stage entry of PCT/DE2006/000799, filed May 10, 2006, which claims priority from German Patent Application No.: DE 10 2005 021 832.6, of May 11, 2005, the contents of which are herein incorporated by reference.

The present invention relates to an air-guiding device of a vehicle according to the preamble of Claim 1.

Such an air-guiding device is known, for example, from DE 103 09 369 A1; it comprises a spoiler, which is arranged in the rear area of a motor vehicle, and which can be adjusted by means of a deployment mechanism between an inoperative position, in which it is substantially within the vehicle contour, and an operating position, in which it extends beyond the vehicle contour. The mechanism is implemented with a simple construction, and it combines, in the deployment movement of the spoiler, translation and rotation components, so that the spoiler, in the operating position, assumes advantageously a position with separation from the vehicle contour. As a result of its construction, the known mechanism allows a maximum deployment angle of the spoiler (with respect to its inoperative position) of approximately 40°.

It is known that such a spoiler has an advantageous influence on, for example, the aerodynamic properties of the vehicle and thus the driving behavior. In particular, at higher speeds, the road adhesion of the vehicle can be increased by a down force effect of the spoiler.

From DE 200 01 695 U1, a car spoiler is known, which can brought, for example, coupled with the braking system of the car, in a position with high air resistance to function as an "air brake," so that the effect of conventional brakes is reinforced. The deployment of the spoiler consists of a simple pivoting about a pivoting shaft that extends in a direction transverse with respect to the vehicle. According to this publication, the coupling of the spoiler to the brake system could be carried out with a hydraulic circuit which is not described in greater detail).

One of the problems of the present invention is to improve an air-guiding device of the type mentioned in the introduction, so as to allow a greater maximum deployment angle of the spoiler.

This problem is solved by an air-guiding device having the characteristics indicated in Claim 1.

The term "spoiler" here denotes an air-guiding body, against which an air current flows during the journey, and which can be designed, for example, as a rigid, approximately plate-shaped, air-guiding profile. In designing the shape of the spoiler, one can have recourse to the large variety of known shapes in this technical field. To reduce the up force during the journey, or to generate a down force, an air-guiding profile which presents the (reversed) shape of an airplane wing is often advantageous.

Although it is preferred for the spoiler to be arranged in the rear area of the vehicle, this is in no way an absolute requirement. Alternatively, the spoiler can also be arranged, for example, in the roof area.

The spoiler base can be designed separately, or it can be designed to form a single piece with the spoiler itself, and it serves as a "connecting member" between the pivoting link mechanism of the invention and the aerodynamically effective spoiler surface. It is preferred for the spoiler base to be arranged on the bottom side of the spoiler, for example, fastened as a separate part to the spoiler.

For the invention, it is essential to provide for the possibility of overstretching the joint between the front region of the spoiler base and the second end of the first pivoting link during the deployment of the spoiler. The term "overstretching" denotes, in the context of the invention, the circumstance that the joint angle concerned can be increased beyond 180° during the spoiler adjustment. This joint angle is enclosed between, on the one hand, the section between the two ends of the first pivoting link and, on the other hand, the section between the two articulation points on the spoiler base.

Thus, the invention combines, using a simple construction, the advantage of a position of the spoiler, which is separate from the vehicle contour in the operating position, with an increased maximum deployment angle of the spoiler.

In an embodiment, the spoiler base and particularly the spoiler base together with the spoiler are accommodated in a recess of the vehicle surface, in the inoperative position. It is preferred for the spoiler to be arranged in its inoperative position in a groove-shaped recess of the vehicle body substantially flush with the vehicle contour. As a result, the spoiler can be brought into an aerodynamically more or less inoperative position.

In a particularly preferred embodiment, the adjusting device, during the overstretching of the joint between the front region of the spoiler base and the second end of the first pivoting link, provides at least one second operating position, in which the spoiler ensures a braking effect during the journey. This means that, in addition to the first operating position (s) which provide(s) a down force effect, at least one additional spoiler position, called the second operating position, is provided, in which the spoiler can be deployed beyond the first operating position, and thus ensure a braking effect.

In an embodiment, the deployment angle of the spoiler in the first operating position, i.e., its pivoting with respect to its orientation in the inoperative position, is in the range from 10° to 50°. One or more first operating positions can be provided, each with a predetermined deployment angle. If the adjusting device provides for the automatic adjustment of the spoiler as a function of predetermined driving parameters, particularly, for example, the driving speed, then, for optimal adaptation of the aerodynamics, it is preferred to provide for continuous adjustability, at least in the adjusting range from the inoperative position to the first operating position of the spoiler.

Because of the design according to the invention, the spoiler can be deployed very far, so that an inoperative position, in which the spoiler is sunk at least partially into the vehicle contour, does not prevent an efficient braking effect of the spoiler in its second operating position. The maximum achievable deployment angle of the spoiler is at least 70°, particularly approximately 90°, in a preferred embodiment.

In an embodiment, the deployment angle of the spoiler in the second operating position is in the range from 50° to 90°. A deployment angle of 85°±5° is preferred to achieve a particularly efficient braking effect.

In a preferred embodiment, the angle of the joint between the front region of the spoiler base and the second end of the first pivoting link in the inoperative position is less than 30° and in the second position more than 210°.

In an embodiment of the invention, the second operating position corresponds to the kinematically maximally overstretched position of the joint between the front region of the spoiler base and the second end of the first pivoting link. The "maximally overstretched position" is reached when the actual deployment angle due to the distances between the four determining articulation points (on the two ends of the two pivoting links) cannot possibly be increased further.

Alternatively, a mechanical abutment can be provided, which stops the deployment movement of the joint arrangement already before the maximum overstretched position is reached. However, this decreases the angular adjusting range that is conceivable from the point of view of kinematics, so that such an abutment is reached preferably at a position of the joint concerned which is at most 10° from its maximally overstretched position. However, one advantage of such a mechanical abutment is that the compressive and tensile loads that occur in practice between the connecting elements of the four determining articulation points can be reduced.

In principle it is conceivable for the adjusting device to be arranged as a unit, for example, in the middle in the transverse direction with respect to the vehicle. For a more stable securing of the spoiler, however, it is preferred for the adjusting device to present at least two adjusting devices that present a distributed (for example, equidistant) arrangement, viewed in the transverse direction with respect to the vehicle. It is preferred to provide two identical adjusting devices, which are symmetric with respect to a vertical longitudinal center plane of the vehicle, which devices in each case comprise a first pivoting link and a second pivoting link, and pivoting bearings or articulations provided at the ends.

In an embodiment of particularly simple construction, the first ends of the two pivoting links are fastened to pivoting bearings which are fixed with respect to the car body. However, it should not be ruled out for at least one of the two pivoting bearings to be moveable during the deployment of the spoiler. As a result, it is possible, for example, to modify the kinematics of the spoiler movement. In addition, it is conceivable for the controllable driving means to produce directly a shifting of the first pivoting bearing or of both pivoting bearings (for example, in a guide rail) and for this pivoting to then produce, via a control surface arrangement (for example, a rocker with a rocker guide), the pivoting of the pivoting link, which is required for the deployment of the spoiler.

To achieve as large as possible a deployment angle range, it is preferred for the separation of the car body-side pivoting bearing of the two pivoting links to be greater than the separation of the two articulations in the area of the spoiler base. In this regard, it is also preferred for the length of the first swivel link to be in the range from 30% to 90% of the length of the second pivoting link.

The adjusting device can work, for example, electrically (for example, electromotor) and/or hydraulically (for example, hydraulic cylinder) and/or pneumatically (for example, pneumatic cylinder). The actuating device in question is activated preferably as a function of the state of movement of the vehicle. In a relevant embodiment, the single first operating position is controlled if a predetermined driving speed is exceeded. Alternatively, if several first operating positions are provided, they can be controlled sequentially if certain driving speeds are exceeded, where the deployment angle increases with increasing driving speed.

For the control the second operating position ("braking position") it is preferred that this position is set as a result of a predetermined "activating event," and leads to an immediate adjustment of the spoiler from the current position into the second operating position. In the case of a predetermined "deactivating event," the spoiler is reset back into the second operating position, preferably into the first operating position, or one of the first operating positions, or (in the case of a vehicle condition-dependent spoiler setting), in the spoiler position corresponding to the current driving condition.

An example of an activating event is case when the current driving speed exceeds a predetermined limit, and in the process a braking device of the vehicle is actuated to such an extent that a predetermined limit is exceeded. The extent of the brake actuation can be detected, in a motor vehicle, for example, from the position of the brake pedal.

Alternatively, or additionally, a manual actuation of an operating element by the driver can be the activating event.

Possible deactivating events, or criteria from which, by a logical linking, the presence of a deactivating event can be deduced, are: the elapse of a predetermined time span since the activating event, a decrease of the speed below a predetermined driving speed, the end of the brake actuation by the driver, or a manual deactivation by means of an operating element by the driver.

In a particularly preferred embodiment, the driving means comprise a driving member, which engages directly with the first pivoting link, or with a pivoting link shaft which is rotatably connected to the first end of the first pivoting link.

A driving member which engages directly with the first pivoting link can be formed, for example, from a driving link, which, on the one hand, is hinged in a middle area of the first pivoting link, and, on the other hand, hinged to the end of a motor driven shaft. Alternatively, such a driving link can be moved, for example, by a worm gear.

A driving member which engages with a pivoting shaft of the first pivoting link can be formed, for example, from a driven gear of a motor drive, which is in engagement with the corresponding gearing of this shaft. Alternatively, a so-called crosslink mechanism, for example, can also be used to drive the pivoting shaft.

In both cases, the motor drive is preferably an electrical step motor.

Figure 2:
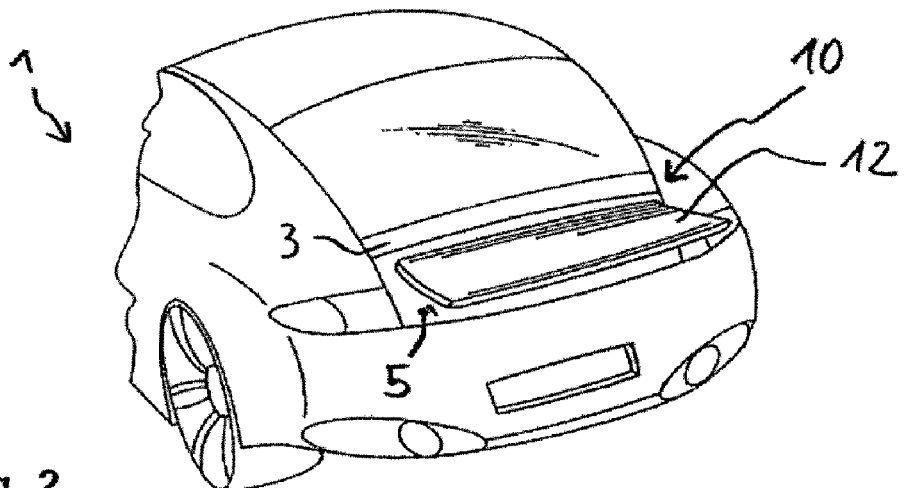
Figure 3:
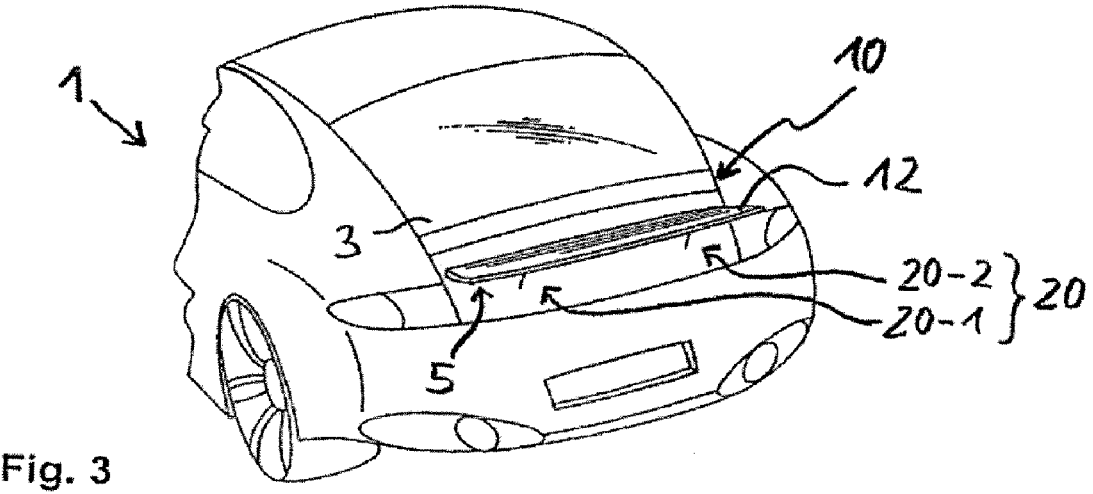
Figure 4:
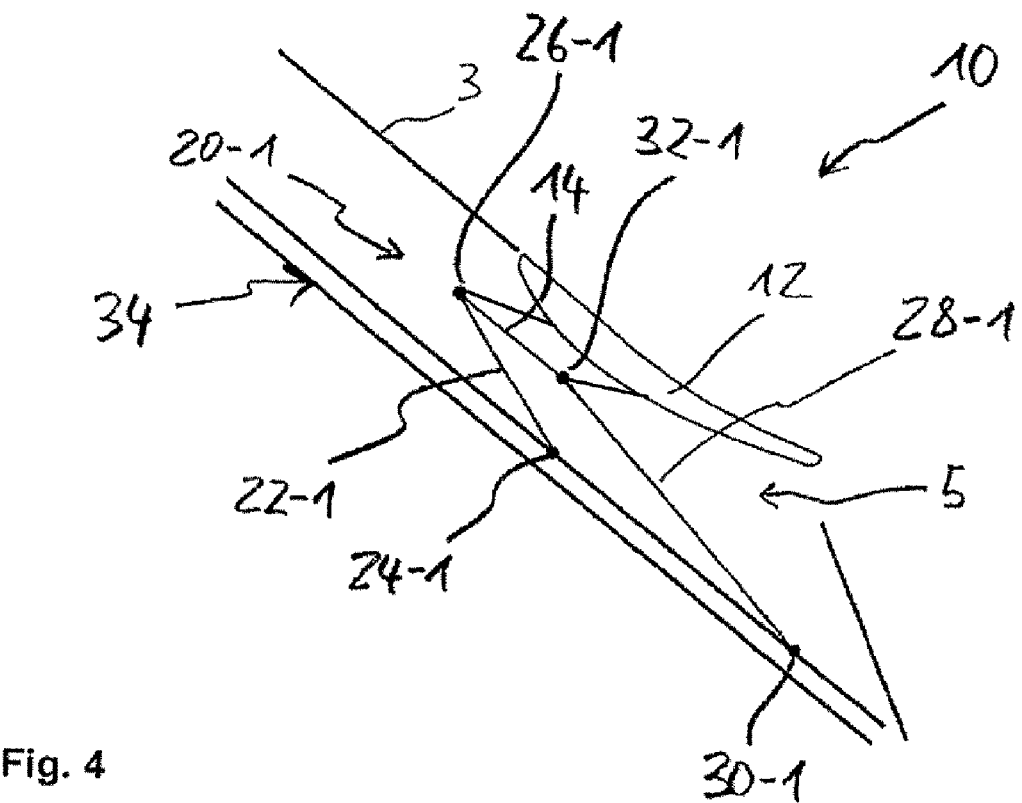
Figure 5:
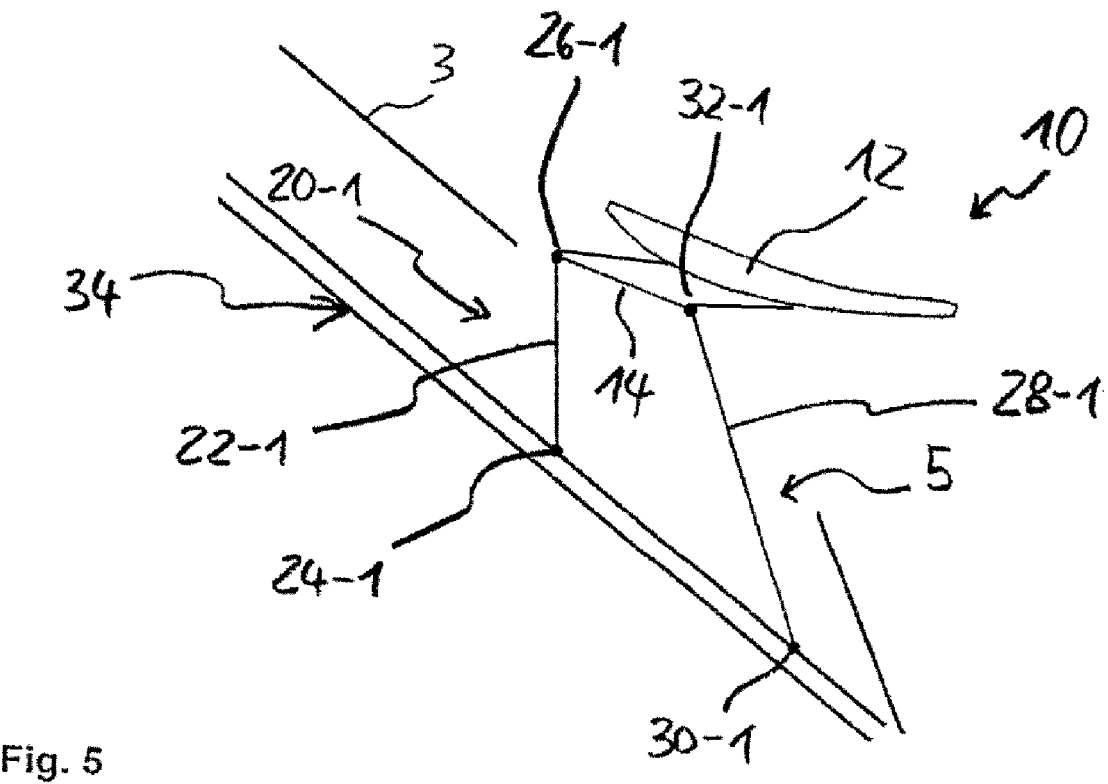
Figure 6:
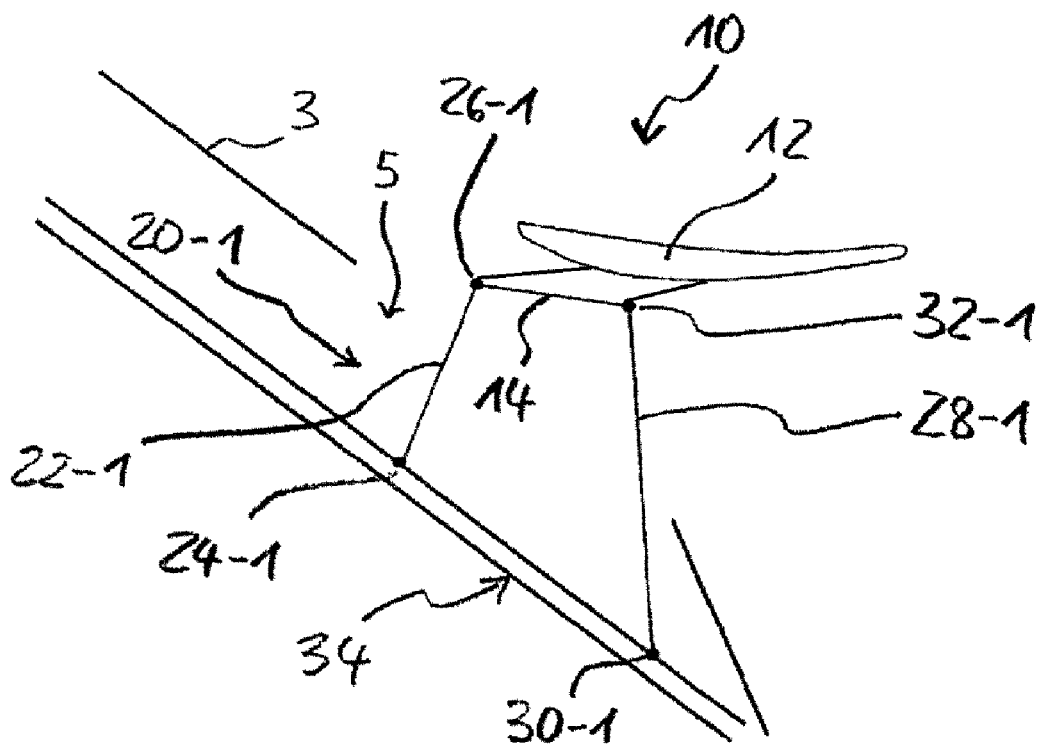
Figure 7:
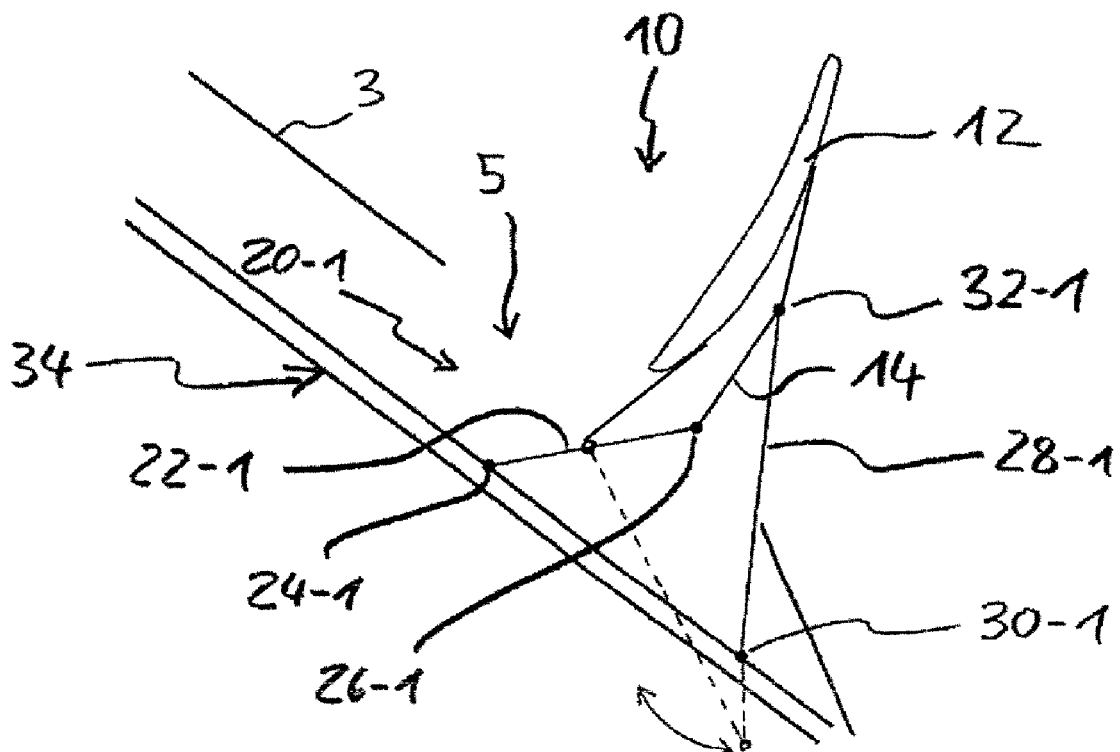
Figure 8:
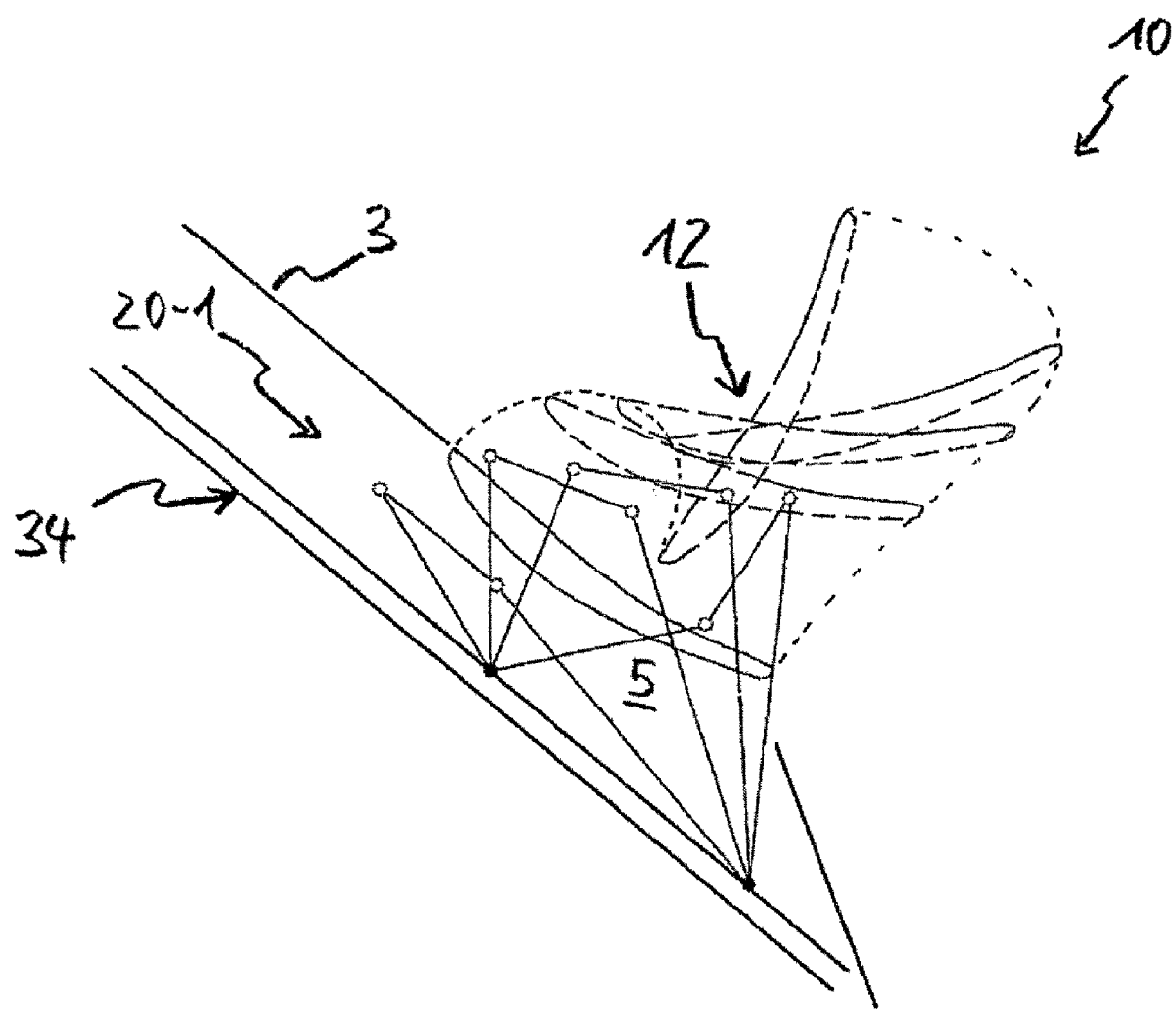

The invention is explained in greater detail below with an embodiment example in reference to the drawing in the appendix. The reference numerals of components that are provided twice in this embodiment example, but present analogous effects, are completed in each case by a dash and "1" or "2." The reference numeral, without the addition, is also used below to refer to individual components, or to those components as a whole. In the drawing:

FIG. 1 represents a perspective view of the rear area of a vehicle with a spoiler in its inoperative position, FIG. 2 represents a perspective view of the rear area, where the spoiler is deployed in a first operating position ("down force position"), FIG. 3 is a perspective view of the rear area, where the spoiler is deployed in a second operating position ("braking position"), FIG. 4 represents a schematic side view of the spoiler adjustment mechanical system with the retracted spoiler, FIG. 5 represents a schematic side view of the spoiler adjusting mechanism during the deployment in the direction of the first operating position, FIG. 6 represents a schematic side view of the spoiler adjusting mechanism, where the spoiler is deployed in its first operating position, FIG. 7 represents a schematic side view of the spoiler adjusting mechanism, where the spoiler is deployed in its second operating position, and FIG. 8 is a schematic side view of the spoiler adjusting mechanism to illustrate the course of movement from the inoperative position into the second operating position (and vice versa).

FIG. 1 shows an air-guiding device 10, comprising a airplane wing-like spoiler 12, which is provided in the rear area of a motor vehicle 1.

In the inoperative position represented in FIG. 1, the top side of the spoiler 12 is substantially flush with the vehicle contour or the vehicle surface 3 in the rear area.

By means of an adjusting device, which is not shown in FIG. 1, the spoiler 12 can be pivoted from the inoperative position, where it is sunk into the vehicle contour 3, into a first operating position, as represented in FIG. 2.

The deployment movement of the spoiler 12 out of its inoperative position (FIG. 1) into the first operating position (FIG. 2) is a movement which is composed of a translation and a rotation.

FIG. 2 illustrates the first operating position, in which the spoiler 12 was deployed by means of the adjusting device beyond the vehicle contour 3, in order to produce, during the journey and in a manner which is known, a down force effect, which improves the road adhesion of the vehicle 1. This first operating position is also referred to as the "down force position" below. In the down force position, the deployment angle of the spoiler 12 (with respect to the inoperative position) is approximately 30°.

The transition between the inoperative position and the down force position, in the represented embodiment example, is controlled automatically if the speed exceeds a predetermined driving speed (for example, 60 km/h). Once the speed is again below this speed limit, the spoiler 12 is retracted again.

If an additional predetermined driving speed, which is preferably substantially greater than the above-mentioned driving speed, is exceeded, then the automatic adjusting system allows the control of a second operating position, in which the spoiler 12 is deployed farther beyond the down force position shown in FIG. 2, to produce a braking effect during the journey.

FIG. 3 shows this additional operating position of the spoiler 12. The transition from the down force position (FIG. 2) into the second operating position (FIG. 3), hereafter also referred to as the "braking position," is triggered by an actuation of the vehicle braking device by the driver to an extent which exceeds a predetermined extent.

In the braking position, the deployment angle of the spoiler 12 is approximately 90°. In this position, a considerable additional braking effect is thus achieved.

As soon as the extent of the braking actuation performed by the driver decreases again below the predetermined extent limit (or in the case where the vehicle 1 is even accelerated), or the driving speed is again below the predetermined second limit speed, the spoiler 12 is automatically reset again into the position corresponding to the current driving speed.

As indicated in FIG. 3, the mechanical system used to adjust the spoiler 12 between the inoperative position, the down force position, and the braking position, present two adjusting devices 20-1 and 20-2, which present an arrangement, viewed in a direction transverse with respect to the vehicle, with mutual separation, and which together form the adjusting device 20 which provides a particularly stable support for the spoiler 12.

The construction of the adjusting device 20 is explained in greater detail below with reference to FIGS. 4 to 7. To simplify, the components drawn in FIGS. 4 to 7 are represented in a highly schematic way. For the practical construction of these components, it is possible to have recourse, for example, to the appropriate designs of pivoting link mechanisms, as described in DE 103 09 369 A1, which was already mentioned in the introduction.

The adjusting devices 20-1 and 20-2 have identical designs in the represented embodiment example. Therefore, the components of the (left) adjusting device 20-1 are represented in FIGS. 4 to 7, while the corresponding components of the (right) adjusting device 20-2 are omitted.

FIG. 4 illustrates the inoperative position of the spoiler 12, which, in this state, is accommodated in a groove or recess 5 of the car body surface 3. The spoiler 12 is connected with the spoiler base 14, for example, a support body, which is screwed to the bottom side of the spoiler body.

The adjusting device 20-1 comprises a front pivoting link 22-1, whose first end is fastened in a front pivoting bearing 24-1 in such way that the front pivoting link 22-1 can be pivoted about a first pivoting axis which extends in a direction transverse with respect to the vehicle. The other end of the front pivoting link 22-1 is connected to the spoiler base 14 by a front articulation 26-1. This front articulation 26-1 is also designed as a pivoting bearing or joint articulation, which allows a relative pivoting between the spoiler base 14 and the front pivoting link 22-1 about an axis which is in a direction transverse with respect to the vehicle.

Moreover, the adjusting device 20-1 comprises a rear pivoting link 28-1, whose first end is fastened in a rear pivoting bearing 30-1 in such a way that the rear pivoting link 28-1 can be pivoted about a second pivoting axis which extends in a direction transverse with respect to the vehicle. The other end of the rear pivoting link 28-1 is connected by a rear articulation 32-1 to the spoiler base 14, where this articulation allows a relative pivoting between the spoiler base and the rear pivoting link 28-1.

The two car body-side pivoting bearings 24-1 and 30-1 are arranged so that they are fixed with respect to the car body on a support structure 34 of the vehicle 1.

On the basis of the represented geometric conditions, or the chosen separations between the articulation points 24-1, 26-1, 30-1 and 32-1, the simultaneous pivoting of the two pivoting links 22-1 and 28-1 adjusts the spoiler base 14 and thus the spoiler 12, starting from the inoperative position represented in FIG. 4 through an intermediate position represented in FIG. 5 into the operating position represented in FIG. 6, and, if needed, further into the braking position represented in FIG. 7.

In the braking position according to FIG. 7, the link 26-1 (between the spoiler base 14 and the upper end of the front pivoting link 22-1) is overstretched. This overstretching makes it possible, with the represented geometric conditions, to rotate the spoiler 12 in this situation by approximately 90° out of its inoperative position.

The components 22-1, 24-1, 26-1, 28-1, 30-1, and 32-1 represented in FIGS. 4 to 7 are also formed identically on the right vehicle side (symmetrically) for the right adjusting device 20-2 (not shown).

The kinematics of the spoiler adjustment achieved with the adjusting device, and the entire course of the movement of the adjusting device 20-1 with the spoiler 12 between the inoperative position and the braking position, are represented again in the combined representation according to FIG. 8.

The automatically controllable driving means provided for adjusting pivot all four pivoting links 22, 28 simultaneously. Here, it is possible for the driving means to act only on one of the two adjusting devices 20-1, 20-2, or on both units.

The driving means can comprise, for example, a crank gear which is actuated by an electromotor, where, for example, a connecting rod, which is rotatably connected in the area of the rear pivoting bearing 30, is connected by an articulation with a relatively long push rod, which in turn is hinged in a middle area of the front pivoting link 22. This drive concept is drawn with broken line in FIG. 7.

It is also conceivable to integrate an actuating device in the area of the spoiler base 14, which acts directly on the front pivoting link 22, to set the angle between these components 14, 22 in a targeted manner.

However, in a preferred design a pivoting link axle is driven directly by an electromotor, where the axle is rotatably connected to the front pivoting link 22, and oriented in a direction transverse with respect to the vehicle. In view of a simultaneous adjustment of both adjusting devices 20-1 and 20-2, it is preferred here to provide a common pivoting link axle for the two front pivoting links 22, i.e., the pivoting link axle is rotatably connected both to the left front pivoting link and to the right front pivoting link (and optionally to the front pivoting links 22 of additional adjusting devices).

The invention claimed is:

1. An air-guiding device of a vehicle comprising a spoiler which is fastened to a spoiler base, as well as an adjusting device for adjusting the spoiler base between an inoperative position in which the spoiler is substantially within the vehicle contour, and at least one first operating position in which the spoiler is deployed beyond the vehicle contour to provide a down force effect during the journey, where the adjusting device comprises:
   a first pivoting link whose first end is fastened to the body of the vehicle in a way which is allows the pivoting of the first pivoting link about a first pivoting axis, which extends in a direction transverse with respect to the vehicle, and whose second end is hinged in a front region of the spoiler base;
   a second pivoting link whose first end is fastened to the body of the vehicle behind the first end of the first pivoting link in a way which allows the pivoting of the second pivoting link about a second pivoting axis which extends in a direction transverse with respect to the vehicle, and whose second end is hinged in a back region of the spoiler base, where the first pivoting link is shorter than the second pivoting link;
   controllable driving means for pivoting the two pivoting links about the spoiler base between the inoperative position and the first operating position;
   characterized in that the adjusting device is designed in a way which allows the overstretching of the joint between the front region of the spoiler base and the second end of the first pivoting link during the deployment of the spoiler in a second operating position wherein, in the second operating position, the deployment angle of the spoiler is in the range from 50° to 90°, whereby a vehicle braking effect is achieved.

2. The air-guiding device of claim 1 where, in the inoperative position, the spoiler base and, particularly, the spoiler base together with the spoiler, are accommodated in a recess of the vehicle contour.

3. The air-guiding device of claim 1 where, in the first operating position, the deployment angle of the spoiler is in the range from 10° to 50°.

4. The air-guiding device of claim 1, wherein the capacity for continuous adjustment is provided at least in the adjusting range from the inoperative position to the first operating position of the spoiler.

5. The air-guiding device of claim 1, wherein the second operating position corresponds to the kinematically maximally overstretched position of the joint between the front end of the spoiler base and the second end of the first pivoting link.

6. The air-guiding device of claim 1, wherein the adjusting device is formed from at least two adjusting devices which, viewed in a direction transverse with respect to the vehicle, presented a distributed arrangement.

7. The air-guiding device of claim 1, wherein the first ends of the two pivoting links are fastened to pivoting bearings which are fixed with respect to the car body.

8. The air-guiding device of claim 1, wherein the separation between the car body-side pivoting bearings of the pivoting links is greater than the separation of the two articulations in the area of the spoiler base.

9. The air-guiding device of claim 1, wherein the driving means comprise a driving member which is engaged directly with the first pivoting link or with a pivoting link axle, which is rotatably connected to the first end of the first pivoting link.

* * * * *